(12) United States Patent
Wang (10) Patent No.: US 10,235,298 B2
(45) Date of Patent: Mar. 19, 2019

(54) SHARED DATA CACHE FOR KERNEL BYPASS APPLICATIONS

(71) Applicant: VMware, Inc., Palo Alto, CA (US)

(72) Inventor: Wenguang Wang, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/622,014

(22) Filed: Jun. 13, 2017

(65) Prior Publication Data

US 2018/0357176 A1    Dec. 13, 2018

(51) Int. Cl.
*G06F 12/0888* (2016.01)
*G06F 12/084* (2016.01)
*G06F 12/1045* (2016.01)

(52) U.S. Cl.
CPC ........ *G06F 12/0888* (2013.01); *G06F 12/084* (2013.01); *G06F 12/1063* (2013.01)

(58) Field of Classification Search
CPC . G06F 12/0888; G06F 12/084; G06F 12/1063
See application file for complete search history.

(56) References Cited

U.S. PATENT DOCUMENTS

| 7,424,710 B1 * | 9/2008 | Nelson | H04L 69/32 718/1 |
| 9,921,984 B2 * | 3/2018 | Neiger | G06F 13/34 |
| 2012/0210066 A1 * | 8/2012 | Joshi | G06F 12/0866 711/118 |
| 2016/0378545 A1 * | 12/2016 | Ho | G06F 9/50 718/107 |

OTHER PUBLICATIONS

Anastasios Papagiannis, Giorgos Saloustros, Manolis Marazakis, and Angelos Bilas. Iris: An optimized I/O stack for low-latency storage devices. SIGOPS Oper. Syst. Rev. 50, 2 (Jan. 2017), 3-11. DOI: https://doi.org/10.1145/3041710.3041713 (Year: 2017).*
Simon Peter et al, "Arrakis: The Operating System is the Control Plane", Proceedings of the 11th USENIX Symposium, 17 pp, Oct. 6-8, 2014, Broomfield, CO.

* cited by examiner

*Primary Examiner* — Ramon A. Mercado (57) ABSTRACT

Techniques for implementing a shared data cache for kernel bypass applications are provided. In one set of embodiments, a shared data caching (SDC) service associated with an instance of a kernel bypass application can create a named shared memory region in user space, where the kernel bypass application is configured to use a user-level Input/Output (I/O) stack for accessing a physical I/O device. The SDC service can further map the named shared memory region into a virtual memory address space of the instance. Then, at a time the instance issues an I/O read request to the physical I/O device, the SDC service can process the I/O read request by accessing the named shared memory region as a data cache.

18 Claims, 5 Drawing Sheets

SHARED DATA CACHE FOR KERNEL BYPASS APPLICATIONS

BACKGROUND

Figure 1:
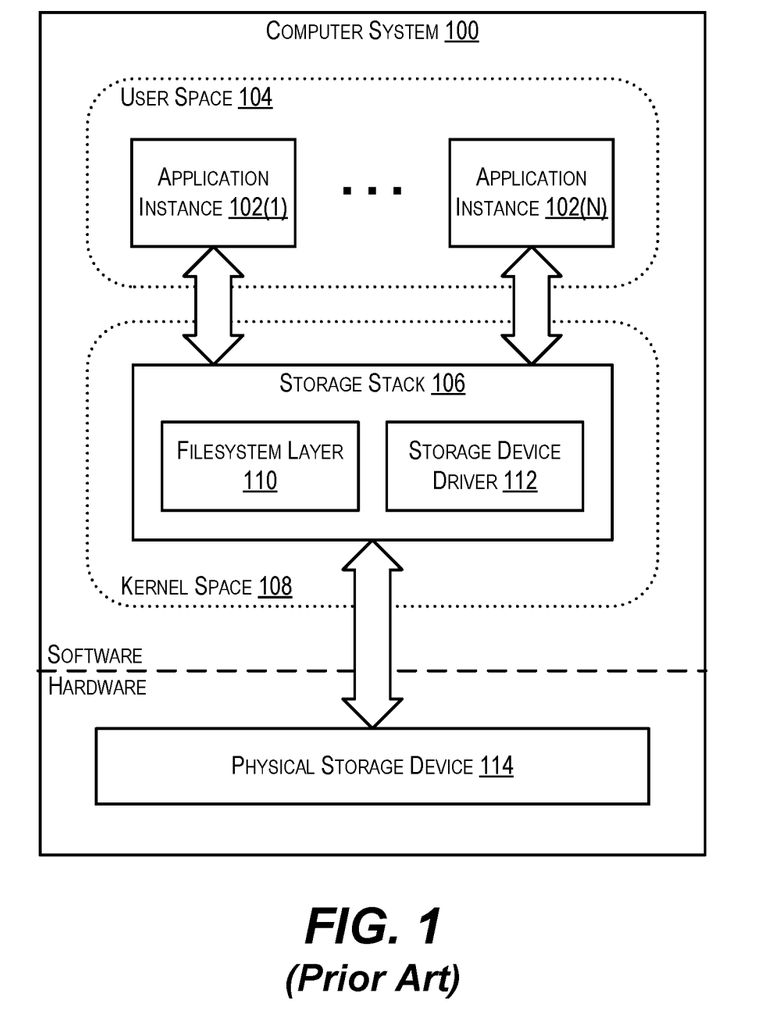
FIG. 1 depicts an example computer system implementing a conventional OS kernel-level storage stack.

Traditional computer systems use an operating system (OS) kernel-level storage stack for mediating application access to physical storage devices such as magnetic disks, flash-based disks, and so on. For example, FIG. 1 depicts a computer system 100 comprising a number of application instances (i.e., processes) 102(1)-(N) running in user space 104 and a storage stack 106 running in kernel space 108. As used herein, "user space" refers to the portion of system memory that is dedicated to user processes, whereas "kernel space" refers to the portion of system memory that is dedicated to the OS kernel and kernel extensions/drivers. Storage stack 106, which includes a file system layer 110 and a storage device driver 112, is communicatively coupled with a physical storage device 114.

When a given application instance 102 wishes to issue an Input/Output (I/O) request to storage device 114, the application instance invokes an OS system call that is exposed by storage stack 106. This invocation causes the system CPU handling the system call to execute a context switch from user mode to kernel mode. While the system CPU is in kernel mode, storage stack 106 processes the I/O request by communicating with storage device 114 and generates an appropriate response for the calling application instance. The system CPU then executes another context switch from kernel mode back to user mode so that the calling application instance can receive the response and continue its runtime operation.

One benefit of kernel-level storage stack 106 is that, due to its function as a centralized mediator of I/O requests issued by application instances 102(1)-(N), it can easily implement caching of the data accessed by these multiple application instances in a shared data cache. Such a shared data cache allows for improved I/O performance in scenarios where application instances 102(1)-(N) access overlapping sets of data and enables more efficient cache space usage in comparison to individual, application-specific caches. However, a significant disadvantage of kernel-level storage stack 106 is that it incurs a context switching overhead for each I/O operation as described above, which can degrade the I/O performance of certain application workloads and can potentially bottleneck the I/O performance of future, high-speed storage devices.

To avoid this context switching overhead, there are a number of emerging technologies that enable a feature known as "kernel bypass" (sometimes referred to as "user-level data plane" or "user-level I/O" processing). With kernel bypass, applications can make use of I/O stacks that reside in user space (i.e., within the virtual address spaces of the applications) rather than in kernel space. Thus, kernel bypass effectively offloads I/O handling from the kernel level to the application (i.e., user) level. This allows applications to interact directly with physical I/O devices such as storage devices, network adapters, etc. without kernel involvement, which in turn eliminates the need to perform context switching on a per I/O basis. However, because kernel bypass decentralizes I/O processing, computer systems that implement this feature no longer have a central I/O mediator (like kernel-level storage stack 106 of FIG. 1) that can perform shared data caching across multiple concurrent application instances.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for implementing a shared data cache for "kernel bypass applications"—in other words, applications that make use of a user-level I/O stack to carry out I/O operations against physical I/O devices. In one set of embodiments, at the time an instance of a kernel bypass application is started/initialized, a shared data caching (SDC) service of the application instance can attempt to access a named shared memory region in user space. If the named shared memory region already exists (i.e., it has been created by another instance of the current application or another kernel bypass application), the SDC service can map the existing region to a portion of the application instance's virtual address space. If the named shared memory region does not yet exist, the SDC service can create it before mapping the region to the application instance's virtual address space.

Then, each time the application instance issues an I/O read request directed to a physical I/O device, the SDC service can execute a workflow for processing the read request against the named shared memory region in a manner that treats the region as a shared data cache (i.e., a data cache that is shared across all kernel bypass application instances). For example, if the requested data is present in the named shared memory region (indicating a cache hit), the SDC service can read the requested data from the region and directly return it to the application instance, without accessing the backend storage/network location where the persistent version of the data resides. If the requested data is not present in the named shared memory region (indicating a cache miss), the application's user-level I/O stack can retrieve the requested data from the backend storage/network location and the SDC service can populate it in the region, thereby making the data available for quick retrieval in response to future requests from the same or different kernel bypass application instances. Significantly, since multiple application instances may attempt to perform these caching operations at the same time, the SDC service can implement this workflow in a way that (1) ensures thread/process safety (i.e., prevents data corruption that may arise from concurrent reads/writes to the named shared memory region), and (2) enforces the use of a consistent cache replacement algorithm/policy across all concurrent application instances.

With the high-level approach above, shared data caching can be achieved for kernel bypass applications, despite the lack of a centralized I/O mediator as found in traditional, kernel-level I/O processing architectures. Thus, the advantages of both kernel bypass (i.e., elimination of context switching overhead) and a shared data cache (i.e., improved I/O performance via data sharing and more efficient cache space usage) can be realized at the same time. The foregoing and other aspects of the present disclosure are described in further detail below.

It should be noted that, for purposes of explanation, the following description discusses certain examples and embodiments pertaining to kernel bypass applications that specifically implement user-level storage stacks. However, the same principles and techniques may be applied to kernel bypass applications that implement other types of user-level I/O processing. For example, in some embodiments, the techniques described herein may be used to enable shared data caching for kernel bypass applications that implement user-level networking (rather than storage) stacks. Accordingly, all references to "storage operations" or to a "storage stack" in the present disclosure may be broadly construed as encompassing more generalized "I/O operations" or a more generalized "I/O stack."

2. System Architecture

Figure 2A:
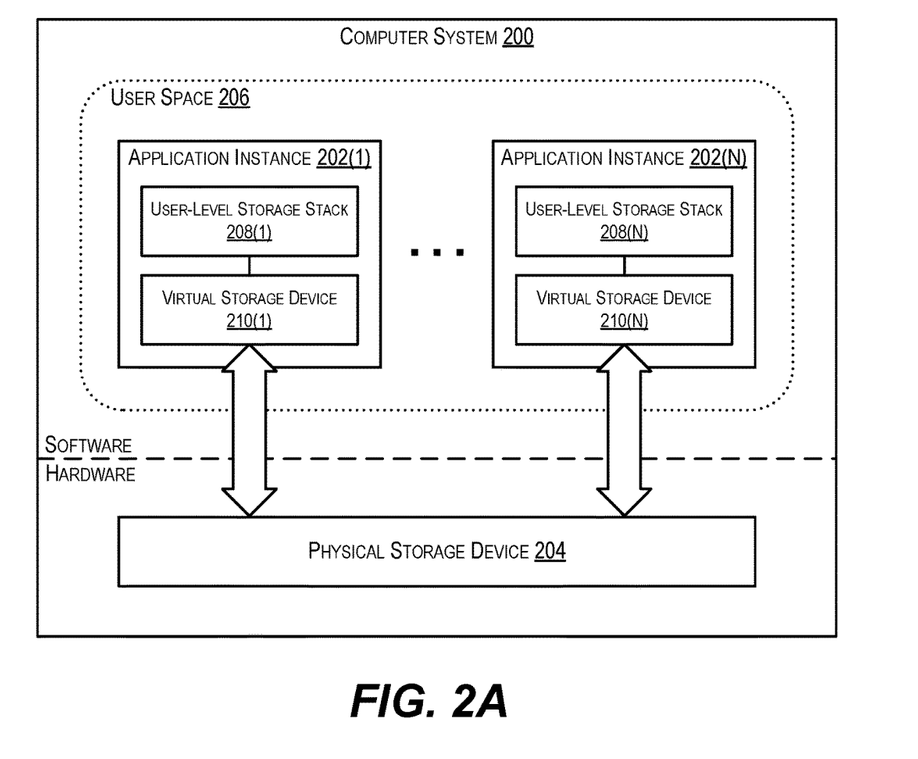
FIGS. 2A and 2B depict example computer systems in which embodiments of the present disclosure may be implemented.

To provide context for the embodiments described herein, FIG. 2A depicts an example computer system 200 comprising a number of application instances 202(1)-(N) that are configured to interact with a physical storage device 204 via kernel bypass. As shown, each application instance 202 resides in a user space 206 of computer system 200 and includes a user-level storage stack 208. Although not depicted, user-level storage stack 208 can include, among other things, a filesystem layer and a low-level storage driver (e.g., a SCSI driver). Each user-level storage stack 208 is communicatively coupled with a virtual storage device 210, which is a virtual representation of physical storage device 204 that is visible to respective application instances 202(1)-(N). This device virtualization may be achieved via any one of a number of I/O virtualization technologies known in the art, such as Single Root I/O Virtualization (SR-IOV).

At a time a given application instance 202 wishes to issue an I/O request to virtual storage device 210 (which it sees as a physical storage device), application instance 202 invokes a function exposed by user-level storage stack 208. In response to the invocation, user-level storage stack 208 processes the request by communicating with virtual storage device 210, which is directly mapped to the hardware of physical storage device 204. User-level storage stack 208 then returns a response to application instance 202 (e.g., either requested read data in the case of an I/O read or a write acknowledgement in the case of an I/O write), which can receive the response and proceed with its runtime operation.

As noted in the Background section, the main benefit of the kernel bypass architecture shown in FIG. 2A is that each application instance 202 handles its own I/O processing via user-level storage stack 208, without any involvement from the system's OS kernel. This is in contrast to the kernel-level I/O architecture shown in FIG. 1, where all application I/O requests are funneled through kernel-level storage stack 106. The implementation of user-level storage stack 208 means that there is no need to perform context switching on a per I/O basis since the entire storage I/O path is executed at the user level, which in turn reduces the latency of storage operations. However, a significant limitation of kernel bypass as it exists today is that it makes shared data caching across multiple concurrent application instances, such as instances 202(1)-(N), more difficult.

Figure 2B:
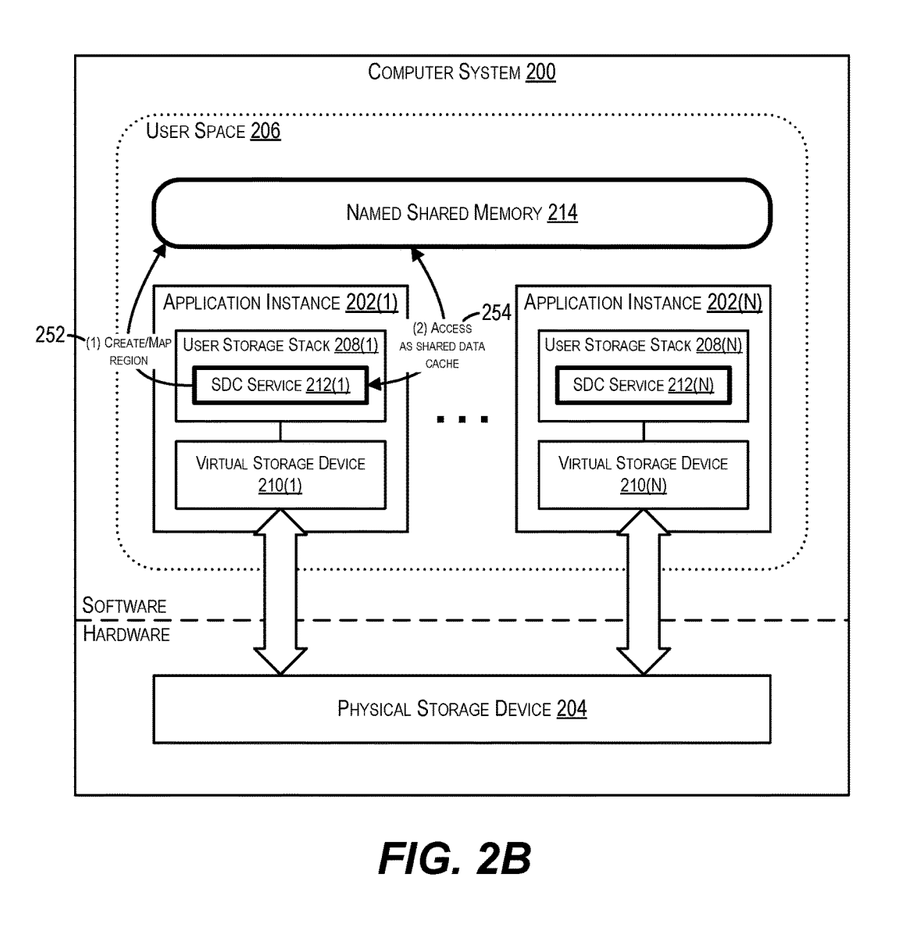

To address this problem, FIG. 2B depicts a modified version of computer system 200 that includes, within each user-level storage stack 208, a shared data caching (SDC) service 212. At a high level, each SDC service 212 can create a named shared memory region 214 in user space 206 (if not created already) that is shared among application instances 202(1)-(N) and can map region 214 into the virtual memory address space of its respective application instance 202 (step (1); reference numeral 250). Each SDC service 212 can then utilize named shared memory region 214 at the time of processing application I/O requests as a shared data cache (step (2); reference numeral 252).

Since named shared memory region 214 is essentially a passive entity that can be accessed by multiple SDC services simultaneously, in various embodiments each SDC service 212 can perform its caching activities with respect to region 214 in a manner that (1) avoids concurrency problems (i.e., avoids data corruption caused by interleaved reads/writes) and (2) implements a consistent cache replacement algorithm/policy across application instances. Further, in some embodiments, each SDC service 212 can implement certain cache processing enhancements that reduce or minimize the performance overheads that may be caused by (1) and (2). A more detailed discussion of the operation of SDC service 212 is presented in the sections that follow.

It should be appreciated that FIGS. 2A and 2B are illustrative and not intended to limit embodiments of the present disclosure. For example, the various components shown in FIGS. 2A and 2B may be arranged according to different configurations and may include subcomponents or functions that are not specifically described. One of ordinary skill in the art will recognize other variations, modifications, and alternatives.

3. Named Shared Memory Region Creation/Mapping

Figure 3:
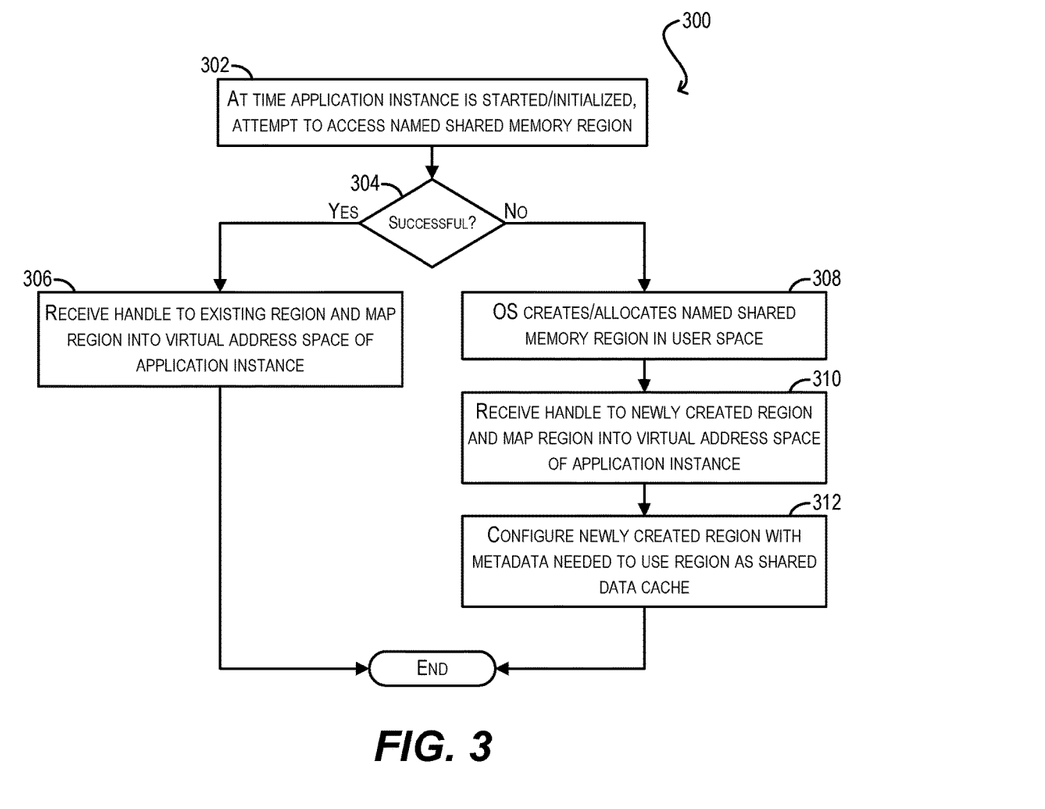
FIG. 3 depicts a workflow for creating/mapping a named shared memory region in user space for use as a shared data cache according to an embodiment.

FIG. 3 depicts a workflow 300 that can be performed by each SDC service 212 for creating and/or mapping named shared memory region 214 (per step (1) of FIG. 2B) in order to prepare it for use as a shared data cache according to an embodiment.

Starting with block 302, at a time the service's corresponding application instance 202 is started/initialized, SDC service 212 can attempt to access (i.e., open a handle to) named shared memory region 214 using a predefined name or identifier that is known to all kernel bypass application instances 202(1)-(N). In a particular embodiment, SDC service 212 can perform this step by invoking an OS system call that is designed to access/create named shared memory, such as the "shm_open( )" call available in POSIX.

If the attempt to access named shared memory region 214 is successful (indicating that region 214 has already by created by another kernel bypass application instance), SDC service 212 can receive a handle to the existing region and can map the region, via the received handle, into the virtual memory address space of application instance 202 (blocks 304 and 306). As part of block 306, SDC service 212 can receive the base virtual memory address of the mapped region and can record this base address so that any memory pointers into named shared memory region 214 that are created by SDC service 212 and/or application instance 202 are maintained as relative pointers (i.e., base address plus offset). Workflow 300 can then end.

However, if the attempt to access named shared memory region 214 at block 302 is unsuccessful (indicating that region 214 has not yet been created), region 214 can be created/allocated in user space 206 by the system OS using the region's predefined name/identifier (blocks 304, 308). SDC service 212 can then receive a handle to the newly created region and can map the region, via the received handle, into the virtual memory address space of application instance 202 (block 310). Like block 306, SDC service 212 can receive and record the base virtual memory address of the mapped region as part of the mapping operation at block 310.

Finally, at block 312, SDC service 212 can configure the newly created region 214 with metadata that will allow it to be used as a shared data cache. The specific nature of this metadata will differ depending on the caching implementation used, but will generally include a cache map/hash table, one or more synchronization primitive objects (e.g., a spinlock, mutex, etc.) for synchronizing shared access to region 214, and one or more data structures for implementing a cache replacement algorithm/policy. In various embodiments, SDC service 212 can create these metadata objects at fixed offsets within named shared memory region 214 that are known/expected by all SDC services 212(1)-(N). Upon completion of this configuration step, workflow 300 can end.

4. Cache Processing

Figure 4:
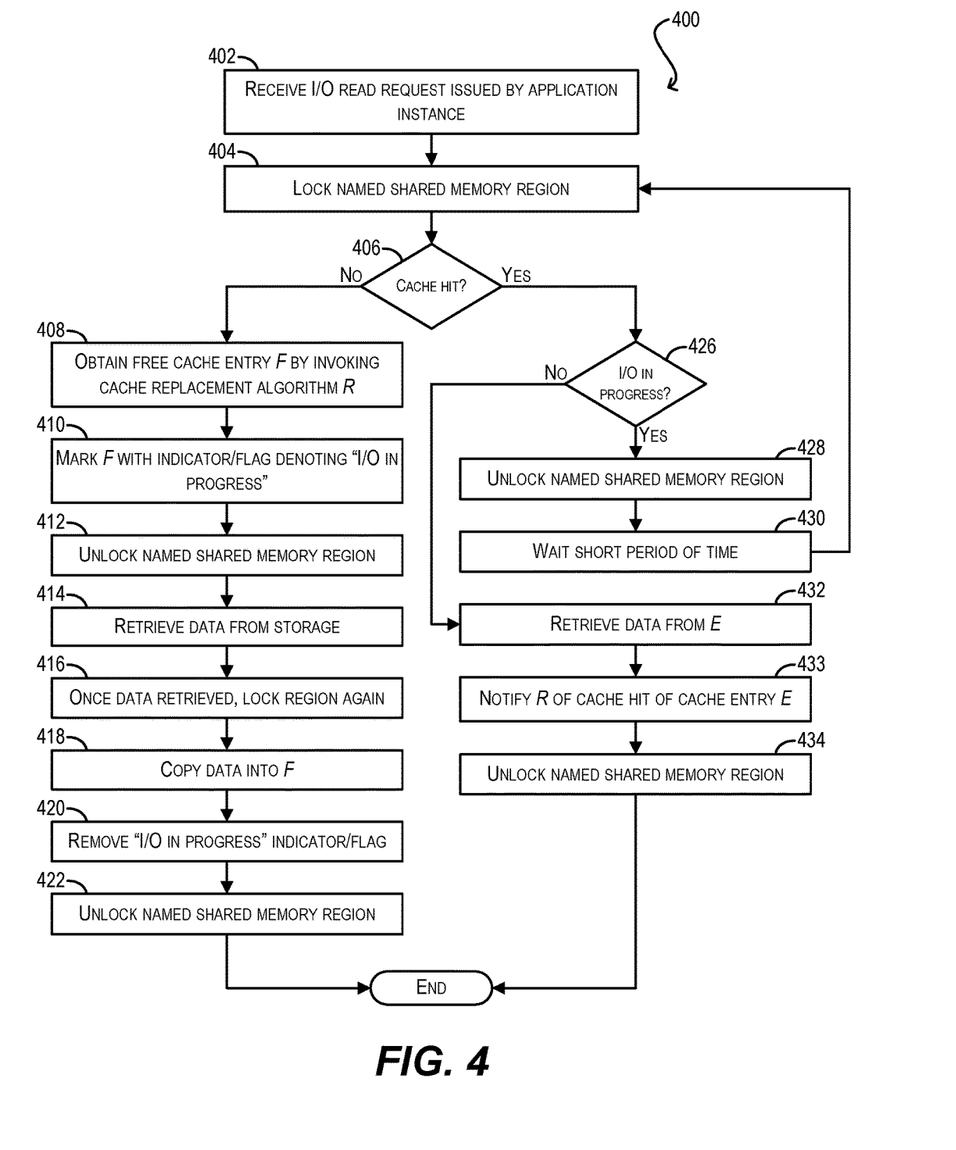
FIG. 4 depicts a workflow for performing cache processing with respect to the named shared memory region created/mapped in FIG. 3 according to an embodiment.

As mentioned with respect to step (2) of FIG. 2B, once a given SDC service 212 has created and/or mapped named shared memory region 214 into the virtual address space of its corresponding application instance 202, SDC service 212 can access region 214 as a data cache in response to I/O read requests issued by application instance 202. FIG. 4 depicts a workflow 400 of this cache processing according to an embodiment. Since this cache processing can be performed concurrently by multiple SDC services (corresponding to different application instances, or different threads of the same application instance), workflow 400 implements a lock/unlock mechanism to avoid data corruption and makes use of a predefined cache replacement algorithm R to ensure consistent management of the cache entries in region 214 across threads/processes.

Starting with block 402, SDC service 212 can receive an I/O read request issued by application instance 202 that includes an identifier (i.e., tag) of the requested data. The tag may be, e.g., a storage block number indicating the location on physical storage device 204 where the data is persisted. In response to the request, SDC service 212 can lock named shared memory region 214 using a synchronization primitive such as a spinlock (block 404). This synchronization primitive can be a data object that is part of the metadata created within named shared memory region at block 312 of FIG. 3.

At block 406, SDC service 212 can check whether the requested data is present in named shared memory region 214 (i.e., whether there is a cache hit or a cache miss). SDC service 212 can perform this check by, e.g., accessing a cache map/hash table in region 214 to determine whether the tag corresponding to the requested data is mapped to any existing cache entry in region 214.

If the requested data is not found in named shared memory region 214 at block 406 (i.e., a cache miss), SDC service 212 can initiate a process for retrieving the data from storage device 204 and populating it in region 214 for future access. In particular, at block 408, SDC service 212 can obtain a free cache entry F in named shared memory region 214 by invoking an appropriate function of predefined cache replacement algorithm R. SDC service 212 can then mark free cache entry F with an indicator or flag denoting that it has "I/O in progress" (block 410), unlock named shared memory region 214 (block 412), and forward the read request to the downstream portions of user-level storage stack 208 to retrieve the requested data from storage device 204 (block 414). By performing these steps, SDC service 212 can (1) inform other concurrent threads/processes that entry F is in the process of being updated, and (2) allow those other threads/processes to access/modify other cache entries in region 214 while the contents of entry F are being retrieved from the physical storage layer.

Once the requested data is retrieved from storage device 204, SDC service 212 can lock named shared memory region 214 again (block 416), copy the data into free cache entry F (block 418), and remove from entry F the "I/O in progress" indicator/flag (block 420). In this way, SDC service 212 can signal that cache entry F is updated and can be accessed by other threads/processes. SDC service 212 can subsequently unlock shared memory region 214 (block 422) and workflow 400 can end.

Returning to block 406, if the requested data is found in named shared memory region 214 (i.e., there is a cache hit of a particular cache entry E), SDC service 212 can check whether cache entry E is marked as having "I/O in progress" (block 426). If so, SDC service 212 can determine that cache entry E is in the process of being updated and thus can unlock named shared memory region 214 (block 428), wait for a short period of time such as a microsecond (block 430), and return to block 404 in order to attempt the entire process again. Thus, SDC service 212 can effectively perform a "sleep-retry" loop while cache entry E is being updated.

On the other hand, if SDC service 212 finds that cache entry E is not marked as having "I/O in progress" at block 426, SDC service 212 can retrieve the requested data from entry E (block 432), notify cache replacement algorithm R regarding the cache hit (block 433), and unlock shared memory region 214 (block 434). Finally, although not explicitly shown, at the conclusion of workflow 400 (i.e., after block 434 or block 422) SDC service 212 can pass the data to user-level storage stack 208, which in turn can return the data to application instance 202 and fulfill the I/O read request.

5. Cache Processing Enhancements

It should be appreciated that cache processing workflow 400 of FIG. 4 is illustrative and various modifications and enhancements are possible. For example, to improve the degree of concurrency for named shared memory region 214, in some embodiments region 214 can be divided into "shards," which are effectively separate cache allocations. Each shard can be associated with its own synchronization primitive (e.g., spinlock). In these embodiments, when an I/O read request is issued by application instance 202, SDC service 212 can hash the tag of the requested data to generate a hash value identifying the shard in which the data resides (or should reside). SDC service 212 can then perform the cache processing steps starting at block 404 of workflow 400 with respect to that particular shard (rather than the entirety of region 214). If named shared memory region 214 is divided into N shards, this approach can potentially increase the concurrency factor of region 214 (i.e., the number of threads/processes that can concurrently access the region) by a factor of N.

Further, to minimize the amount of time for which named shared memory region 214 is locked within workflow 400, in some embodiments SDC service 212 may specifically use a clock-based cache replacement algorithm to identify free cache entries (per block 408) and to record cache hits (per block 433). As known in the art, a clock-based cache replacement algorithm involves setting a per-entry bit (known as a "referenced" bit) in a circular array to indicate when a particular cache entry is hit and sweeping a clock pointer through the array to identify a next free entry. In these embodiments, since the operation of recording a cache hit simply involves the setting of a single bit (i.e., the referenced bit of the cache entry that is hit), SDC service 212 can eliminate the initial locking that is performed at block 404 and can perform the cache hit recordation at block 433 via an atomic compare-and-swap CPU instruction. This completely avoids the need to lock and unlock the entirety of named shared memory region 214 in the case of a cache hit, and only needs to lock cache entry E to prevent it from disappearing while being copied at block 432. In the case of a cache miss, SDC service 212 can lock the region before obtaining a free cache entry at block 408.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing a shared data cache for kernel bypass applications, the method comprising:
    creating, by a shared data caching (SDC) service associated with an instance of a kernel bypass application running on a computer system, a named shared memory region in a user space of the computer system, the kernel bypass application being configured to use a user-level Input/Output (I/O) stack for accessing a physical I/O device;
    mapping, by the SDC service, the named shared memory region into a virtual memory address space of the instance; and
    at a time the instance issues an I/O read request to the physical I/O device, processing, by the SDC service, the I/O read request by accessing the named shared memory region as a data cache, the processing comprising:
        determining whether data requested via the I/O read request is present in the named shared memory region; and
        if the data is not present:
            locking the named shared memory region;
            obtaining, via a predefined cache replacement algorithm, a free cache entry in the named shared memory region;
            marking the free cache entry with an indicator indicating that I/O for the free cache entry is in progress;
            unlocking the named shared memory region; and
            retrieving the data from the physical I/O device.

2. The method of claim 1 wherein the SDC service accesses the named shared memory region as a data cache concurrently with one or more other SDC services associated with instances of one or more other kernel bypass applications running on the computer system.

3. The method of claim 1 wherein the creating and the mapping are performed at a time the instance of the kernel bypass application is initialized.

4. The method of claim 1 further comprising, upon retrieving the data from the physical I/O device:
    locking the named shared memory region;
    copying the data into the free cache entry;
    unmarking the indicator in the free cache entry; and
    unlocking the named shared memory region.

5. The method of claim 1 further comprising, if the data is present in the named shared memory region:
    recording, via the predefined cache replacement algorithm, a hit of an existing cache entry;
    if the existing cache entry is marked as having I/O in progress, entering a wait and retry loop; and if the existing cache entry is not marked as having I/O in progress, retrieving the data from the existing cache entry.

6. The method of claim 5 wherein the predefined cache replacement algorithm is a clock-based algorithm, and wherein recording the hit of the existing cache entry comprises executing an atomic compare-and-swap instruction in order to update a referenced bit associated with the existing cache entry.

7. A non-transitory computer readable storage medium having stored thereon program code executable by a computer system, the program code embodying a method for implementing a shared data cache for kernel bypass applications, the method comprising:
   creating, by a shared data caching (SDC) service associated with an instance of a kernel bypass application running on the computer system, a named shared memory region in a user space of the computer system, the kernel bypass application being configured to use a user-level Input/Output (I/O) stack for accessing a physical I/O device;
   mapping, by the SDC service, the named shared memory region into a virtual memory address space of the instance; and
   at a time the instance issues an I/O read request to the physical I/O device, processing, by the SDC service, the I/O read request by accessing the named shared memory region as a data cache, the processing comprising:
      determining whether data requested via the I/O read request is present in the named shared memory region; and
      if the data is not present:
         locking the named shared memory region;
         obtaining, via a predefined cache replacement algorithm, a free cache entry in the named shared memory region;
         marking the free cache entry with an indicator indicating that I/O for the free cache entry is in progress;
         unlocking the named shared memory region; and
         retrieving the data from the physical I/O device.

8. The non-transitory computer readable storage medium of claim 7 wherein the SDC service accesses the named shared memory region as a data cache concurrently with one or more other SDC services associated with instances of one or more other kernel bypass applications running on the computer system.

9. The non-transitory computer readable storage medium of claim 7 wherein the creating and the mapping are performed at a time the instance of the kernel bypass application is initialized.

10. The non-transitory computer readable storage medium of claim 7 wherein the method further comprises, upon retrieving the data from the physical I/O device:
   locking the named shared memory region;
   copying the data into the free cache entry;
   unmarking the indicator in the free cache entry; and
   unlocking the named shared memory region.

11. The non-transitory computer readable storage medium of claim 7 wherein the method further comprises, if the data is present in the named shared memory region:
   recording, via the predefined cache replacement algorithm, a hit of an existing cache entry;
   if the existing cache entry is marked as having I/O in progress, entering a wait and retry loop; and
   if the existing cache entry is not marked as having I/O in progress, retrieving the data from the existing cache entry.

12. The non-transitory computer readable storage medium of claim 11 wherein the predefined cache replacement algorithm is a clock-based algorithm, and wherein recording the hit of the existing cache entry comprises executing an atomic compare-and-swap instruction in order to update a referenced bit associated with the existing cache entry.

13. A computer system comprising:
   a processor;
   a physical Input/Output (I/O) device;
   a system memory; and
   a non-transitory computer readable medium having stored thereon program code for implementing a shared data cache for kernel bypass applications configured to access the physical I/O device via user-level I/O storage stacks, the program code causing the processor to:
      create, via a shared data caching (SDC) service associated with an instance of a kernel bypass application running on the computer system, a named shared memory region in a user space of the system memory;
      map, via the SDC service, the named shared memory region into a virtual memory address space of the instance; and
      at a time the instance issues an I/O read request to the physical I/O device, process, via the SDC service, the I/O read request by accessing the named shared memory region as a data cache, the processing comprising:
         determining whether data requested via the I/O read request is present in the named shared memory region; and
         if the data is not present:
            locking the named shared memory region;
            obtaining, via a predefined cache replacement algorithm, a free cache entry in the named shared memory region;
            marking the free cache entry with an indicator indicating that I/O for the free cache entry is in progress;
            unlocking the named shared memory region; and
            retrieving the data from the physical I/O device.

14. The computer system of claim 13 wherein the SDC service accesses the named shared memory region as a data cache concurrently with one or more other SDC services associated with instances of one or more other kernel bypass applications running on the computer system.

15. The computer system of claim 13 wherein the creating and the mapping are performed at a time the instance of the kernel bypass application is initialized.

16. The computer system of claim 13 wherein the program code further causes the processor to, upon retrieving the data from the physical I/O device:
   lock the named shared memory region;
   copy the data into the free cache entry;
   unmark the indicator in the free cache entry; and
   unlock the named shared memory region.

17. The computer system of claim 13 wherein the program code further causes the processor to, if the data is present in the named shared memory region:
   record, via the predefined cache replacement algorithm, a hit of an existing cache entry;
   if the existing cache entry is marked as having I/O in progress, enter a wait and retry loop; and if the existing cache entry is not marked as having I/O in progress, retrieve the data from the existing cache entry.

18. The computer system of claim 17 wherein the predefined cache replacement algorithm is a clock-based algorithm, and wherein recording the hit of the existing cache entry comprises executing an atomic compare-and-swap instruction in order to update a referenced bit associated with the existing cache entry.

* * * * *